US012679066B2

(12) United States Patent
Mochizuki et al.

(10) Patent No.: US 12,679,066 B2
(45) Date of Patent: Jul. 14, 2026

(54) LAMINATE AND METHOD FOR USING LAMINATE

(71) Applicant: SEKISUI CHEMICAL CO., LTD.,
Osaka (JP)

(72) Inventors: Hiroaki Mochizuki, Yamaguchi (JP);
Kenichi Matsumura, Yamaguchi (JP);
Takehisa Sugaya, Osaka (JP)

(73) Assignee: SEKISUI CHEMICAL CO., LTD.,
Osaka (JP)

( * ) Notice: Subject to any disclaimer, the term of this
patent is extended or adjusted under 35
U.S.C. 154(b) by 469 days.

(21) Appl. No.: 18/025,722

(22) PCT Filed: Sep. 24, 2021

(86) PCT No.: PCT/JP2021/034976
§ 371 (c)(1),
(2) Date: Mar. 10, 2023

(87) PCT Pub. No.: WO2022/071087
PCT Pub. Date: Apr. 7, 2022

(65) Prior Publication Data
US 2023/0339207 A1      Oct. 26, 2023

(30) Foreign Application Priority Data
Sep. 29, 2020      (JP) ................................. 2020-163929

(51) Int. Cl.
B32B 5/24          (2006.01)
B32B 27/08          (2006.01)
(Continued)

(52) U.S. Cl.
CPC ................ B32B 5/24 (2013.01); B32B 27/08
(2013.01); B32B 27/20 (2013.01); B32B
27/304 (2013.01);
(Continued)

(58) Field of Classification Search
CPC .. B32B 7/027; B32B 5/24; B32B 5/02; B32B
5/26; B32B 17/04; B32B 17/10;
(Continued)

(56) References Cited

U.S. PATENT DOCUMENTS

2017/0157889 A1      6/2017   Ishikawa et al.
2020/0055276 A1      2/2020   Katsuya et al.
(Continued)

FOREIGN PATENT DOCUMENTS

CN          101515636          8/2009
CN          208538940          2/2019
(Continued)

OTHER PUBLICATIONS

Omnexus, Fire Resistance (LOI), accessed online Apr. 15, 2025.*
(Continued)

*Primary Examiner* — Camie S Thompson
(74) *Attorney, Agent, or Firm* — Wenderoth, Lind &
Ponack, L.L.P.

(57)          ABSTRACT
The present invention provides a laminate that has excellent
flame-shielding performance and heat-shielding perfor-
mance and can reduce the transmission of flame and heat
generated by ignition inside a battery to the outside, espe-
cially when used as a cover for an in-vehicle battery.
Provided is a laminate including: a fiber layer including a
resin and a fiber; and a thermal insulation layer formed on
at least one surface of the fiber layer.

12 Claims, 2 Drawing Sheets

(51) Int. Cl.

*B32B 27/20*        (2006.01)

*B32B 27/30*        (2006.01)

(52) U.S. Cl.

CPC ....... *B32B 2250/03* (2013.01); *B32B 2250/40* (2013.01); *B32B 2262/101* (2013.01); *B32B 2305/076* (2013.01); *B32B 2457/10* (2013.01)

(58) Field of Classification Search

CPC ...... B32B 2264/1022; B32B 2264/108; B32B 2307/7376; B32B 2307/546; B32B 2307/076; B32B 2307/304; B32B 2307/718; B32B 2307/738; B32B 1/00; B32B 27/08; B32B 27/12; B32B 27/20; B32B 27/304; B32B 27/34365; B32B 2250/076; B32B 235/076; B32B 2457/10; B32B 2605/08; B32B 2262/101; B32B 2262/106; H01M 10/658; H01M 50/278; H01M 50/126; H01M 50/276; H01M 50/282; H01M 50/28; H01M 50/20; H01M 2220/20; Y02E 60/10

USPC ......................................................... 428/36

See application file for complete search history.

(56) References Cited

U.S. PATENT DOCUMENTS

| | | | |
|---|---|---|---|
| 2020/0212389 | A1 | 7/2020 | Kuroiwa et al. |
| 2020/0277456 | A1 | 9/2020 | Katsuya et al. |
| 2021/0376405 | A1* | 12/2021 | Browning ............... B32B 15/20 |

FOREIGN PATENT DOCUMENTS

| | | | |
|---|---|---|---|
| CN | 110603145 | 12/2019 | |
| CN | 111417674 | 7/2020 | |
| JP | 02-258255 | 10/1990 | |
| JP | 07-25144 | 5/1995 | |
| JP | 11-122782 | 4/1999 | |
| JP | 2001-261910 | 9/2001 | |
| JP | 2001-294048 | 10/2001 | |
| JP | 2007-153980 | 6/2007 | |
| JP | 2013-97883 | 5/2013 | |
| JP | 2015-83365 | 4/2015 | |
| JP | 2016-519010 | 6/2016 | |
| JP | 6269483 | 1/2018 | |
| JP | 2018-20564 | 2/2018 | |
| JP | 2018-174284 | 11/2018 | |
| JP | 2018-206605 | 12/2018 | |
| JP | 2019-138038 | 8/2019 | |
| JP | 2019-143031 | 8/2019 | |
| JP | 2020-49925 | 4/2020 | |
| WO | 2014/197098 | 12/2014 | |
| WO | 2015/083820 | 6/2015 | |
| WO | WO-2018062172 A1 * | 4/2018 | .......... H01M 10/658 |
| WO | 2019/044801 | 3/2019 | |

OTHER PUBLICATIONS

Axim Mica, Mica as an Insulator, accessed online Oct. 15, 2025.*

International Search Report issued Nov. 30, 2021 in International (PCT) Application No. PCT/JP2021/034976, with English translation.

Tongkao Xu, "Practical Technology for Plastic Modification", China Light Industry Press, Oct. 2012, p. 161, with explanation of relevance.

* cited by examiner

LAMINATE AND METHOD FOR USING LAMINATE

TECHNICAL FIELD

The present invention relates to a laminate that has excellent flame-shielding performance and heat-shielding performance and can reduce the transmission of flame and heat generated by ignition inside a battery to the outside, especially when used as a cover for an in-vehicle battery.

BACKGROUND ART

Various batteries, such as lithium-ion batteries, are at risk of thermal runaway and ignition due to events such as internal short circuits. In particular, in-vehicle batteries can undergo thermal runaway and ignite due to the impact of a vehicular accident, for example, and may cause a vehicle fire. Covers for batteries thus need to impede the transmission of heat from the battery to the surroundings when the battery has become abnormally hot due to thermal runaway, or impede the transmission of flame generated by battery ignition to the outside.

As an example of such a cover for an in-vehicle battery, Patent Literature 1 discloses a battery casing made of a metal material such as iron or aluminum.

Patent Literature 2 discloses a vehicle battery casing including a metal material such as an aluminum alloy or stainless steel as a substrate.

Patent Literature 3 discloses an in-vehicle battery containing body constituted by a laminate that includes a layer including a thermoplastic resin such as polyamide and a reinforcing fiber such as glass fiber.

CITATION LIST

Patent Literature

Patent Literature 1: JP 2001-294048 A
Patent Literature 2: JP 2013-97883 A
Patent Literature 3: WO 2019/044801

SUMMARY OF INVENTION

Technical Problem

However, covers including a metal material as a substrate as disclosed in Patent Literatures 1 and 2 may not sufficiently reduce the transmission of heat generated by battery ignition and may fail to prevent the inside of the vehicle from rapidly becoming hot. The in-vehicle battery containing body disclosed in Patent Literature 3 may not sufficiently reduce the combustion of the resin itself.

The present invention aims to provide a laminate that has excellent flame-shielding performance and heat-shielding performance and can reduce the transmission of flame and heat generated by ignition inside a battery to the outside, especially when used as a cover for an in-vehicle battery.

Solution to Problem

The present invention relates to a laminate including: a fiber layer including a resin and a fiber; and a thermal insulation layer formed on at least one surface of the fiber layer.

The present invention is described in detail below.

After extensive studies, the present inventors found out that forming a thermal insulation layer on at least one surface of a fiber layer including a resin and a fiber can impede the transmission of flame and heat generated inside a battery to the outside especially when the laminate is used as a cover for an in-vehicle battery. The inventors thus completed the present invention.

The laminate of the present invention includes a fiber layer including a resin and a fiber.

The presence of the fiber layer enables the laminate to exhibit sufficient mechanical strength and prevent damage and the like due to collision accidents when the laminate is used as a battery cover.

The fiber layer includes a resin.

Examples of the resin include: synthetic resins such as thermoplastic resins and thermosetting resins; and elastomers.

Examples of the thermoplastic resins include chlorinated polyvinyl chloride resins (CPVC), polyvinyl chloride resins (PVC), polyolefins such as polyethylene and polypropylene, polystyrene (PS), acrylonitrile-styrene copolymers (AS resins), acrylonitrile-butadiene-styrene copolymers (ABS resins), acrylic resins such as polymethyl methacrylate, polyamides, polycarbonates, polysulfone (PSU resin), polyphenylsulfone (PPSU), polyethersulfone (PES resin), polyetherimide (PEI resin), polyphenylene sulfide (PPS resin), polyester resins such as polyethylene terephthalate and polybutylene terephthalate, polyacetals, polyimides, polyphenylene ether, polyether ether ketone, and liquid crystal polymers.

Examples of the thermosetting resins include polyurethanes, phenolic resins, epoxy resins, urea resins, melamine resins, silicone resins, unsaturated polyester resins, alkyd resins, and thermosetting polyimides.

Examples of the elastomers include thermoplastic elastomers such as olefin elastomers, styrene elastomers, ester elastomers, amide elastomers, and vinyl chloride elastomers.

The above resins may be used alone or in combination of two or more thereof.

In particular, thermoplastic resins are preferred, and chlorinated polyvinyl chloride resins are more preferred.

The resin may be crosslinked or modified as long as the effects of the present invention are not impaired.

The method for crosslinking is not limited. Examples thereof include crosslinking methods typically used for the above resin components, such as crosslinking methods involving the use of various crosslinking agents or peroxides and crosslinking methods involving electron ray irradiation.

When the resin includes a chlorinated polyvinyl chloride resin, the chlorinated polyvinyl chloride resin preferably has a chlorine content of 57% by mass or greater and 72% by mass or less.

A decrease in the chlorine content decreases heat resistance, while an increase in the chlorine content decreases moldability.

The chlorine content of the chlorinated polyvinyl chloride resin is more preferably 60% by mass or greater and 71% by mass or less.

The chlorine content can be measured by a method in conformity with JIS K 7229, for example.

The chlorinated polyvinyl chloride resin preferably has an average degree of polymerization of 400 to 3,000, more preferably 600 to 2,000.

The average degree of polymerization within the range is advantageous in that thermally decomposed products of the resin are less likely to disperse in combustion, allowing the flame-shielding performance to be kept high.

The average degree of polymerization can be measured by a method in conformity with JIS K 6720-2:1999, for example.

The chlorinated polyvinyl chloride resin is a resin obtained by chlorinating a polyvinyl chloride resin (PVC).

Examples of the polyvinyl chloride resin include a vinyl chloride homopolymer, a copolymer of a vinyl chloride monomer and a monomer with unsaturated bond(s) that is copolymerizable with the vinyl chloride monomer, and a graft copolymer obtained by grafting a vinyl chloride monomer to a polymer. These polymers may be used alone or in combination of two or more thereof.

Examples of the monomer with unsaturated bond(s) that is copolymerizable with the vinyl chloride monomer include α-olefins, vinyl esters, vinyl ethers, (meth)acrylates, aromatic vinyls, vinyl halides, and N-substituted maleimides. These monomers may be used alone or in combinations of two or more.

Examples of the α-olefins include ethylene, propylene, and butylene.

Examples of the vinyl esters include vinyl acetate and vinyl propionate.

Examples of the vinyl ethers include butyl vinyl ether and cetyl vinyl ether.

Examples of the (meth)acrylates include methyl (meth) acrylate, ethyl (meth)acrylate, butyl acrylate, and phenyl methacrylate.

Examples of the aromatic vinyls include styrene and α-methyl styrene.

Examples of the vinyl halides include vinylidene chloride and vinylidene fluoride.

Examples of the N-substituted maleimides include N-phenyl maleimide and N-cyclohexyl maleimide.

The polymer to which vinyl chloride is graft copolymerized is not limited as long as vinyl chloride can be graft polymerized. Examples of such a polymer include ethylene copolymers, acrylonitrile-butadiene copolymers, polyurethane, chlorinated polyethylene, and chlorinated polypropylene. These may be used alone or in combination of two or more. Examples of the ethylene copolymers include ethylene-vinyl acetate copolymers, ethylene-vinyl acetate-carbon monoxide copolymers, ethylene-ethyl acrylate copolymers, ethylene-butyl acrylate-carbon monoxide copolymers, ethylene-methyl methacrylate copolymers, and ethylene-propylene copolymers.

The average degree of polymerization of the PVC is not limited, and a typical average degree of polymerization of 400 to 3,000 is preferred. The average degree of polymerization is more preferably 600 to 2,000. The average degree of polymerization can be measured by a method specified in JIS K 6720-2:1999.

The method for polymerizing the PVC is not limited. A conventionally known method such as aqueous suspension polymerization, bulk polymerization, solution polymerization, or emulsion polymerization can be used.

The resin preferably has an oxygen index of 20 or greater.

When the oxygen index is 20 or greater, the resin can exhibit excellent flame-shielding performance.

The oxygen index is more preferably 22 or greater and is preferably 90 or less, more preferably 70 or less.

The oxygen index is the minimum concentration (% by volume) of oxygen necessary to sustain combustion of a material. It is determined in conformity with JIS K7201-2: 2007, for example.

The resin preferably has a weight average molecular weight of 1,000 to 1,000,000. Thermosetting resins are preferably crosslinked to such an extent that they do not flow when heated, but the extent of crosslinking is not limited to the extent.

The weight average molecular weight can be measured by a method in conformity with ASTM D 2503, for example.

The weight average molecular weight also can be measured by gel permeation chromatography (GPC) using appropriate standards (e.g., polymethyl methacrylate standards). Examples of a column used for measuring the weight average molecular weight include TSKgel SuperAWM-H.

The resin has a glass transition temperature of preferably 0° C. or higher, more preferably 20° C. or higher, still more preferably 40° C. or higher, and preferably 300° C. or lower, more preferably 250° C. or lower, still more preferably 200° C. or lower.

The glass transition temperature can be measured in conformity with JIS K 7121, for example.

The amount of the resin in the fiber layer is preferably 10% by mass or greater, more preferably 20% by mass or greater and is preferably 80% by mass or less, more preferably 70% by mass or less.

The fiber layer includes a fiber.

Examples of the fiber include reinforcing fibers such as carbon fibers, metal fibers, organic fibers, and inorganic fibers.

Examples of the carbon fibers include PAN carbon fibers, pitch carbon fibers, cellulose carbon fibers, and vapor-grown carbon fibers.

Examples of the metal fibers include fibers made of metals such as iron, gold, silver, copper, aluminum, brass, and stainless steel.

Examples of the organic fibers include fibers made of organic materials such as aramids, polybenzoxazole (PBC), polyphenylene sulfide, polyesters, polyamides, and polyethylene.

Examples of the inorganic fibers include fibers made of inorganic materials such as glass, basalt, silicon carbide, and silicon nitride. Examples of the glass fibers include E glass, C glass, S glass, and T glass.

In particular, carbon fibers and inorganic fibers are preferred. Carbon fibers and glass fibers are more preferred.

The fiber has an average fiber size of preferably 2 μm or greater, more preferably 3 μm or greater, and preferably 30 μm or less, more preferably 26 μm or less.

The average fiber size can be calculated from the average of the fiber sizes at 10 random points in an image captured with a scanning electron microscope (SEM), for example.

The fiber may be a discontinuous fiber that is intermittently divided, or may be a continuous fiber that is not divided.

When the fiber is discontinuous fiber, the fiber has an average fiber length of preferably 2 mm or greater, more preferably 4 mm or greater, and preferably 100 mm or less, more preferably 80 mm or less.

The average fiber length can be calculated from the average of the fiber lengths of 20 random samples each measured with a caliper, for example.

The fiber has a specific gravity of preferably 1.5 or greater, more preferably 1.7 or greater, still more preferably 2.0 or greater, and preferably 3.0 or less, more preferably 2.7 or less, still more preferably 2.6 or less.

The specific gravity can be measured with an electronic densimeter, for example.

The fiber may be in any form. Examples thereof include a fiber form and a form of a sheet of woven fabric, knitted fabric, or non-woven fabric.

When the fiber is in a sheet form, the fiber has a weight per unit area of preferably 100 g/m² or greater, more preferably 350 g/m² or greater, and preferably 1,000 g/m² or less, more preferably 650 g/m² or less.

The weight per unit area can be measured by, for example, cutting the sheet-form fiber to a size of 10 cm×10 cm, measuring the weight of the cut sheet-form fiber, and calculating the weight per unit area.

The amount of the fiber in the fiber layer is preferably 10% by mass or greater, more preferably 20% by mass or greater and is preferably 80% by mass or less, more preferably 70% by mass or less.

When the amount of the fiber is within the range, the fiber can sufficiently increase the mechanical strength of the laminate.

The fiber layer may optionally include, in addition to the resin and the fiber, additives such as thermal stabilizers, lubricants, inorganic fillers, pigments, flame retardants, antioxidants, processing aids, ultraviolet absorbers, and light stabilizers.

The thickness of the fiber layer is preferably 0.2 mm or greater, more preferably 0.4 mm or greater and is preferably 10 mm or less, more preferably 7 mm or less.

When the laminate of the present invention includes two or more fiber layers, the "thickness of the fiber layer" means the total thickness of the fiber layers.

The proportion, by mass, of the fiber layer in the laminate of the present invention is preferably 1/10 or greater, more preferably 2/10 or greater and is preferably 9/10 or less, more preferably 8/10 or less.

The proportion of the thickness of the fiber layer in the thickness of the laminate of the present invention is preferably 1/10 or greater, more preferably 2/10 or greater and is preferably 9/10 or less, more preferably 8/10 or less.

The laminate of the present invention includes a thermal insulation layer on at least one surface of the fiber layer.

The presence of the thermal insulation layer enables the laminate to impede the transmission of flame and heat generated inside a battery to the outside when the laminate is used as a cover for an in-vehicle battery.

The thermal insulation layer preferably includes a resin.

Examples of the resin include the same resin as the resin constituting the fiber layer.

In particular, a chlorinated polyvinyl chloride resin is preferred.

The amount of the resin in the thermal insulation layer is preferably 50% by mass or greater, more preferably 70% by mass or greater and is preferably 99% by mass or less, more preferably 97% by mass or less.

The thermal insulation layer may include an inorganic filler.

Examples of the inorganic filler include silica, diatomite, alumina, zinc oxide, titanium oxide, calcium oxide, magnesium oxide, iron oxide, tin oxide, antimony oxide, ferrites, calcium hydroxide, magnesium hydroxide, aluminum hydroxide, basic magnesium carbonate, calcium carbonate, magnesium carbonate, zinc carbonate, barium carbonate, dawsonite, hydrotalcite, calcium sulfate, barium sulfate, gypsum fiber, calcium silicate, talc, clay, mica, montmorillonite, bentonite, activated clay, sepiolite, imogolite, sericite, glass beads, silica balloons, aluminum nitride, boron nitride, silicon nitride, carbon black, graphite, carbon balloons, charcoal powder, various metal powders, potassium titanate, magnesium sulfate, lead zirconium titanate, aluminum borate, molybdenum sulfide, silicon carbide, stainless steel fibers, zinc borate, various magnetic powders, fly ash, and dewatered sludge.

The amount of the inorganic filler in the thermal insulation layer is preferably 0.1% by mass or greater, more preferably 1% by mass or greater and is preferably 50% by mass or less, more preferably 30% by mass or less.

The thermal insulation layer may further include additives such as thermal stabilizers, lubricants, and foaming agents.

The foaming agents are not limited and may be chemical foaming agents or physical foaming agents.

Examples of the chemical foaming agents include thermally decomposable inorganic foaming agents, thermally decomposable organic foaming agents, inorganic reactive foaming agents based on sodium bicarbonate and acid, and organic reactive foaming agents based on isocyanate and water.

Examples of the thermally decomposable inorganic foaming agents include thermally expandable graphite, acid ammonium, sodium carbonate, ammonium hydrogen carbonate, sodium hydrogen carbonate, ammonium nitrite, sodium borohydride, and monosodium citrate anhydrous.

Examples of the thermally decomposable organic foaming agents include: azo compounds such as azodicarbonamide, azodicarboxylic acid metal salts (e.g., barium azodicarboxylate), and azobisisobutyronitrile; nitroso compounds such as N,N'-dinitrosopentamethylenetetramine; hydrazine derivatives such as hydrazodicarbonamide, 4,4'-oxybis (benzenesulfonylhydrazide), and toluenesulfonylhydrazide; and semicarbazide compounds such as toluenesulfonylsemicarbazide.

Examples of physical foaming agents include: vermiculite; and thermally expandable particles having hydrocarbon encapsulated therein.

The thermal insulation layer has a thickness before heating of preferably 0.2 mm or greater, more preferably 0.3 mm or greater, and preferably 10 mm or less, more preferably 7 mm or less.

The proportion, by mass, of the thermal insulation layer in the laminate of the present invention is preferably 1/10 or greater, more preferably 2/10 or greater and is preferably 9/10 or less, more preferably 8/10 or less.

The proportion of the thickness of the thermal insulation layer in the thickness of the laminate of the present invention is preferably 1/10 or greater, more preferably 2/10 or greater and is preferably 9/10 or less, more preferably 8/10 or less.

The proportion of the thickness of the thermal insulation layer to the thickness of the fiber layer (thickness of thermal insulation layer/thickness of fiber layer) is preferably 1/10 or greater, more preferably 2/10 or greater and is preferably 9/10 or less, more preferably 8/10 or less.

The laminate of the present invention may further include, on a surface of the thermal insulation layer opposite to the surface facing the fiber layer, a fiber layer including a resin and a fiber.

In other words, the laminate of the present invention may have a laminated structure of fiber layer (A)/thermal insulation layer (B)/fiber layer (C), where the fiber layer (A) is the fiber layer having the thermal insulation layer on at least one surface thereof, and the fiber layer (C) is the fiber layer formed on a surface of the thermal insulation layer opposite to the surface facing the fiber layer (A).

The structure of the fiber layer may be the same as that of the fiber layer described above.

When the laminate of the present invention includes the fiber layer (A) and the fiber layer (C), the ratio of the thickness of the fiber layer (A) to the thickness of the fiber layer (C) (thickness of fiber layer (A)/thickness of fiber layer (C)) is preferably 10/1 or greater, more preferably 10/2 or greater and is preferably 10/10 or less, more preferably 10/9 or less.

When the laminate of the present invention includes the fiber layer (A) and the fiber layer (C), the ratio of the mass of the fiber layer (A) to the mass of the fiber layer (C) (mass of fiber layer (A)/mass of fiber layer (C)) is preferably 10/1 or greater, more preferably 10/2 or greater and is preferably 10/10 or less, more preferably 10/9 or less.

The laminate of the present invention may have any shape. Examples thereof include a film shape, a plate shape, a sheet shape, a cylindrical shape, a ring shape, a frame shape, and a box shape.

The laminate of the present invention preferably has a thermal conductivity before heating of 0.05 W/mK or greater, more preferably 0.1 W/mK or greater, and preferably 0.5 W/mK or less, more preferably 0.4 W/mK or less.

The thermal conductivity can be measured in conformity with JIS R 2616, for example.

The laminate of the present invention preferably has a thermal conductivity after heating at 800° C. for one minute of 0.01 W/mK or greater, more preferably 0.05 W/mK or greater, and preferably 0.15 W/mK or less, more preferably 0.12 W/mK or less.

When the thermal conductivity is within the range, the laminate can sufficiently reduce the transmission of flame and heat generated by ignition inside a battery to the outside when used as a cover for an in-vehicle battery.

In the laminate of the present invention, the rate of change of thermal conductivity after heating at 800° C. for one minute, represented by the following formula (1), is preferably 0.5 or greater and 50 or less.

$$\text{(Rate of change of thermal conductivity)} = [(\text{Thermal conductivity before heating}) - (\text{Thermal conductivity after heating})]/(\text{Thermal conductivity after heating}) \quad (1)$$

The rate of change within the range is advantageous in that the heat-shielding performance can be increased without greatly increasing the thickness of the laminate before heating.

The rate of change is more preferably 1 or greater and is more preferably 30 or less, still more preferably 10 or less.

In the laminate of the present invention, the rate of decrease in thermal conductivity after heating at 800° C. for one minute, represented by the following formula (2), is preferably 50% or greater, more preferably 55% or greater and is preferably 95% or less, more preferably 90% or less.

$$\text{(Rate of decrease in thermal conductivity)} = [(\text{Thermal conductivity before heating}) - (\text{Thermal conductivity after heating})]/(\text{Thermal conductivity before heating}) \times 100 \quad (2)$$

In the laminate, the rate of volume expansion, represented by the following formula (3), after heating at 800° C. for one minute is preferably 2 times or greater.

$$\text{(Rate of volume expansion)} = [(\text{Maximum thickness after heating}) - (\text{Thickness before heating})]/(\text{Thickness before heating}) \quad (3)$$

The rate of volume expansion of two times or greater is advantageous in that the heat-shielding performance can be increased without greatly increasing the thickness of the laminate before heating.

The rate of volume expansion is more preferably 2.2 times or greater and is preferably 10 times or less, more preferably 7 time or less.

The laminate of the present invention may be produced by, for example, preparing a composition containing materials to constitute the fiber layer such as the resin and the fiber and a composition containing materials to constitute the thermal insulation layer such as the resin, and forming the fiber layer and the thermal insulation layer. If necessary, the layers may be formed such that they form the structure of fiber layer (A)/thermal insulation layer (B)/fiber layer (C).

The fiber layer and the thermal insulation layer may be formed by a method such as an extrusion molding method or an injection molding method, for example.

The laminate of the present invention, having excellent flame-shielding performance and heat-shielding performance, can be suitably used as any of various molded members such as a member of transportation machinery or a member of battery systems. Moreover, the laminate of the present invention can be suitably used as a member of battery systems used in transportation machinery.

Examples of the transportation machinery include automobiles such as gasoline-powered vehicles, hybrid vehicles, electric vehicles, and fuel cell vehicles; motorcycles such as gasoline-powered motorcycles, hybrid motorcycles, and electric motorcycles; bicycles such as power assisted bicycles; railway vehicles; vessels; and aircraft.

Examples of the member of transportation machinery include mechanism members, interior members, exterior members, windowpanes, and light covers.

Examples of the mechanism members include cooling pipes, air bag covers, air ducts, heater units, and covers for in-vehicle batteries.

Examples of the interior members include ceiling, instrument panels, console boxes, arm rests, seat belt buckles, switches, and door trims.

Examples of the exterior members include emblems, number plate housings, bumper cores, and under covers.

Examples of the battery systems include primary batteries such as nickel manganese batteries, lithium batteries, and zinc-air batteries; secondary batteries such as nickel hydrogen batteries, lithium-ion batteries, and lead storage batteries; solar cells such as silicon solar cells, dye-sensitized solar cells, and perovskite solar cells; and fuel cells such as solid polymer fuel cells, alkali fuel cells, phosphoric acid fuel cells, and solid oxide fuel cells.

Examples of the member of battery systems include battery covers, battery cooling water jackets, hydrogen tank covers, connectors, and insulation sheets.

Examples of the member of battery systems used in transportation machinery include covers for batteries for transportation machinery and covers for in-vehicle batteries.

The laminate of the present invention can be particularly suitably used as a cover for a lithium-ion battery. Moreover, the laminate can be suitably used as a cover for an in-vehicle battery because the laminate can reduce the transmission of flame and heat generated by ignition inside a battery to the outside if the battery undergoes thermal runaway.

The laminate of the present invention is particularly preferably used as a cover for a lithium-ion battery.

Advantageous Effects of Invention

The present invention can provide a laminate that has excellent flame-shielding performance and heat-shielding performance and can reduce the transmission of flame and heat generated by ignition inside a battery to the outside, especially when used as a cover for an in-vehicle battery.

DESCRIPTION OF EMBODIMENTS

Figure 1:
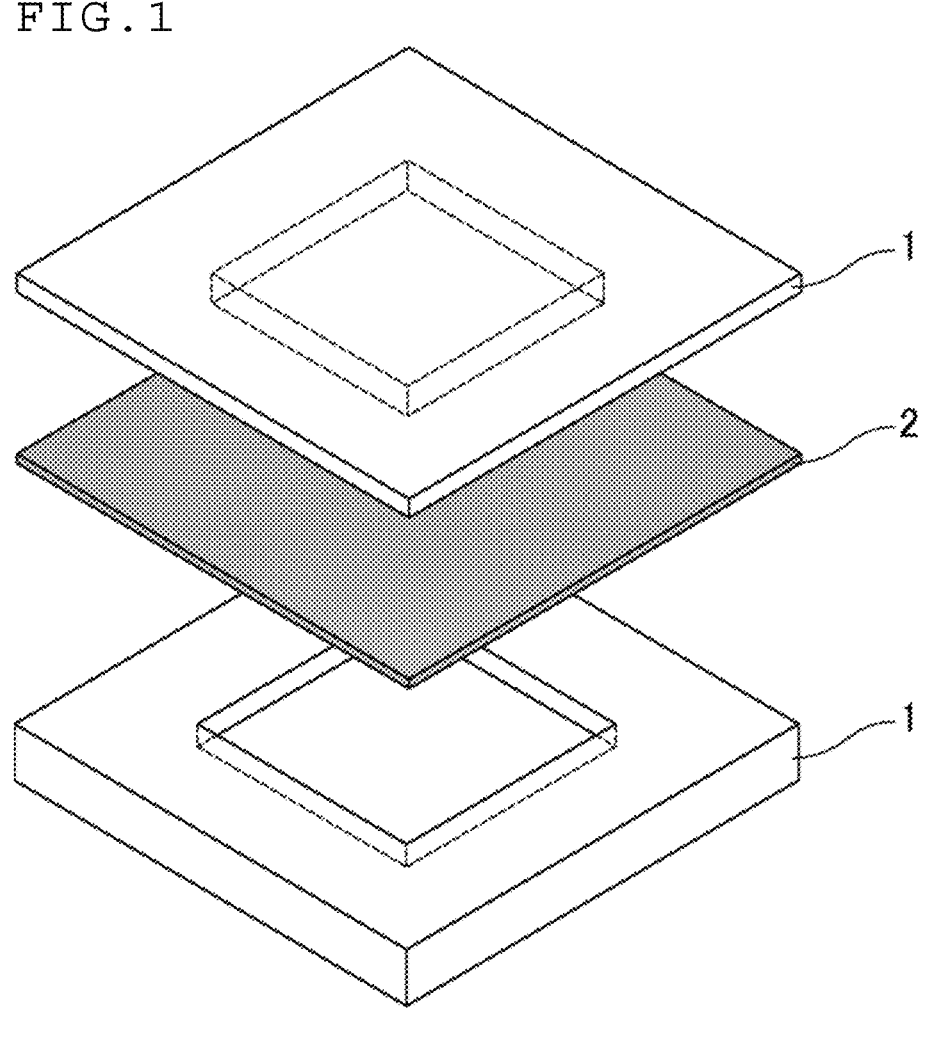
FIG. 1 is a perspective view of a mold for molding a battery cover.

The present invention is hereinafter described in more detail with reference to examples. The present invention should not be limited to these examples.

The following materials were used in the examples and the comparative examples.

EXAMPLE 1

Preparation of Fiber Layers (A) and (C)

One hundred parts by mass of a chlorinated polyvinyl chloride resin (CPVC, produced by Tokuyama Sekisui Co., Ltd., average degree of polymerization 1,000, chlorine content 72.0% by mass) and 10 parts by mass of a thermal stabilizer (produced by Nitto Kasei Co., Ltd., organotin thermal stabilizer "TVS #1380") were mixed with 400 parts by mass of tetrahydrofuran (THF, produced by FUJIFILM Wako Pure Chemical Corporation) to prepare a resin solution.

The chlorine content of the resin was measured by a method in conformity with JIS K 7229. The average degree of polymerization of the resin was measured by a method in conformity with JIS K 6720-2:1999.

Subsequently, a sheet-form glass fiber ("MC450A" produced by Nitto Boseki Co., Ltd., average fiber size 7 μm, average fiber length 50 nm, specific gravity 2.6, weight per unit area 450 g/m$^2$) was impregnated with the resin solution by a hand lay-up method. The process was repeated seven times to stack seven glass fiber layers. Then, the THF was evaporated by drying with a drier, whereby fiber layers (A) and (C) were obtained. The thickness of the obtained fiber layers (A) and (C) was 1.7 mm. The (fiber mass/resin mass) was 1.13. The average fiber size of the glass fiber was calculated from the average of the fiber sizes at randomly selected 10 points in an image captured with a scanning electron microscope (SEM). The average fiber length was calculated from the average of the fiber lengths of randomly selected 20 samples each measured with a caliper. The specific gravity was calculated with an electronic densimeter (produced by Alfa Mirage, "ED120T"). The weight per unit area of the glass fiber was determined by cutting the sheet-form glass fiber to a size of 10 cm×10 cm, measuring the weight of the cut sheet-form glass fiber, and calculating the weight (g) per m$^2$.

Preparation of Thermal Insulation Layer (B)

One hundred parts by mass of a chlorinated polyvinyl chloride resin (produced by CPVC, Tokuyama Sekisui Co., Ltd., average degree of polymerization 500, chlorine content 67.3% by mass), 10 parts by mass of a thermal stabilizer (produced by Nitto Kasei Co., Ltd., organotin thermal stabilizer "TVS #1380"), 2 parts by mass of a lubricant ("WAX-OP" produced by Clariant), and 1 part by mass of an inorganic filler (carbon black, "BLACKPEARLS L" produced by Cabot Corporation) were mixed and roll-kneaded to prepare a thermal insulation layer (B) having a thickness of 0.3 mm.

Preparation of Laminate

The fiber layer (A), the thermal insulation layer (B), and the fiber layer (C) were stacked (fiber layer (A)-thermal insulation layer (B)-fiber layer (C)) and pressed with a press machine, whereby a laminate was obtained.

EXAMPLE 2

A laminate was obtained as in Example 1 except that in (Preparation of fiber layers (A) and (C)), the (fiber mass/resin mass) was 1.13, and that in (Preparation of thermal insulation layer (B)), 10 parts by mass of titanium oxide ("TIPAQUE CR-90" produced by Ishihara Sangyo Kaisha, Ltd.) was used instead of 1 part by mass of carbon black.

EXAMPLE 3

In (Preparation of fiber layers (A) and (C)), a glass fiber-reinforced thermoplastic prepreg containing a polyamide resin ("Tepexdynalite 102-FG290(x)/45%" produced by LANXESS) was used to prepare fiber layers (A) and (C) having a thickness of 1.7 mm. The (fiber mass/resin mass) was 1.12.

A laminate was obtained as in Example 2 except that the obtained fiber layers (A) and (C) were used.

EXAMPLE 4

In (Preparation of fiber layers (A) and (C)), a glass fiber-reinforced thermoplastic prepreg containing a polycarbonate resin ("Tepexdynalite 102fr-FG290(x)/45%" produced by LANXESS) was used to prepare fiber layers (A) and (C) having a thickness of 1.7 mm. The (fiber mass/resin mass) was 1.13.

A laminate was obtained as in Example 2 except that the obtained fiber layers (A) and (C) were used.

EXAMPLE 5

A laminate was obtained as in Example 2 except that in (Preparation of fiber layers (A) and (C)), a polyvinyl chloride resin (PVC, produced by Tokuyama Sekisui Co., Ltd., average degree of polymerization 1,000, chlorine content 56.7% by mass) was used as the resin, and that the (fiber mass/resin mass) was 1.54.

EXAMPLE 6

A laminate was obtained as in Example 2 except that in (Preparation of fiber layers (A) and (C)), a chlorinated polyvinyl chloride resin (CPVC, produced by Tokuyama Sekisui Co., Ltd., average degree of polymerization 500, chlorine content 67.3% by mass) was used as the resin, and that the (fiber mass/resin mass) was 1.54.

EXAMPLE 7

A laminate was obtained as in Example 6 except that in (Preparation of fiber layers (A) and (C)), a sheet-form carbon fiber ("T-700" produced by Toray Industries Inc., average fiber size 10 μm, specific gravity 2.1, weight per unit area 220 g/m$^2$) as the fiber, and that the (fiber mass/resin mass) was 1.09.

EXAMPLE 8

A laminate was obtained as in Example 6 except that in (Preparation of thermal insulation layer (B)), a polyvinyl chloride resin (PVC, produced by Tokuyama Sekisui Co., Ltd., average degree of polymerization 500, chlorine content 56.7% by mass) was used as the resin.

EXAMPLE 9

A laminate was obtained as in Example 6 except that in (Preparation of thermal insulation layer (B)), a polycarbonate resin (produced by Mitsubishi Gas Chemical Company, Inc., PCZ-500) was used as the resin, and that the thermal insulation layer (B) was produced without the addition of the thermal stabilizer and the lubricant.

EXAMPLE 10

A laminate was obtained as in Example 9 except that in (Preparation of thermal insulation layer (B)), a polyamide resin (produced by Unitika Ltd., A1030BRT) was used as the resin, and that the thermal insulation layer (B) was produced without the addition of the thermal stabilizer and the lubricant.

EXAMPLE 11

A laminate was obtained as in Example 6 except that in (Preparation of thermal insulation layer (B)), expandable graphite ("EXP-50S300" produced by Fujikokuen Co., Ltd.) was used instead of titanium oxide.

EXAMPLE 12

A laminate was obtained as in Example 6 except that in (Preparation of fiber layers (A) and (C)), a sheet-form glass fiber ("MC 380A" produced by Nitto Boseki Co., Ltd., average fiber size 7 μm, average fiber length 50 nm, specific gravity 2.6, weight per unit area 380 g/m$^2$) was used as the fiber, and that the (fiber mass/resin mass) was 1.35.

EXAMPLE 13

A laminate was obtained as in Example 6 except that in (Preparation of fiber layers (A) and (C)), a sheet-form glass fiber ("MC 600A" produced by Nitto Boseki Co., Ltd., average fiber size 7 μm, average fiber length 50 nm, specific gravity 2.6, weight per unit area 600 g/m$^2$) was used as the fiber, and that the (fiber mass/resin mass) was 2.10.

EXAMPLE 14

A laminate was obtained as in Example 3 except that in (Preparation of thermal insulation layer (B)), a polyamide resin (produced by Unitika Ltd., A1030BRT) was used as the resin, and that the thermal insulation layer (B) was produced without the addition of the thermal stabilizer and the lubricant.

EXAMPLE 15

A laminate was obtained as in Example 4 except that in (Preparation of thermal insulation layer (B)), a polycarbonate resin (produced by Mitsubishi Gas Chemical Company, Inc., PCZ-500) was used as the resin, and that the thermal insulation layer (B) was produced without the addition of the thermal stabilizer and the lubricant.

Comparative Example 1

One hundred parts by mass of a chlorinated polyvinyl chloride resin (CPVC, produced by Tokuyama Sekisui Co., Ltd., average degree of polymerization 1,000, chlorine content 72.0% by mass), 10 parts by mass of a thermal stabilizer (produced by Nitto Kasei Co., Ltd., "TVS #1380"), and 2 parts by mass of a lubricant ("WAX-OP" produced by Clariant) were mixed and roll-kneaded to prepare resin layers each having a thickness of 0.3 mm.

The obtained resin layers were stacked and press-molded, whereby a laminate having a thickness of 2.0 mm was obtained.

Comparative Example 2

One hundred parts by mass of a chlorinated polyvinyl chloride resin (CPVC, produced by Tokuyama Sekisui Co., Ltd., average degree of polymerization 1,000, chlorine content 72.0% by mass) and 10 parts by mass of a thermal stabilizer (produced by Nitto Kasei Co., Ltd., organotin thermal stabilizer "TVS #1380") were mixed with 400 parts by mass of tetrahydrofuran (THF, produced by FUJIFILM Wako Pure Chemical Corporation) to prepare a resin solution.

Subsequently, a sheet-form glass fiber ("MC450A-104SS" produced by Nitto Boseki Co., Ltd., average fiber size 7 μm, weight per unit area 450 g/m$^2$) was impregnated with the resin solution by a hand lay-up method. The process was repeated to stack glass fiber layers. Then the THF was evaporated by drying with a drier, whereby a laminate having a thickness of 2.0 mm was obtained. The (fiber mass/resin mass) was 0.98.

Comparative Example 3

A glass fiber-reinforced thermoplastic prepreg containing a polyamide resin ("Tepexdynalite 102-FG290(x)/45%" produced by LANXESS) was used to prepare a fiber layer having a thickness of 2.5 mm. The (fiber mass/resin mass) was 1.12.

Comparative Example 4

A glass fiber-reinforced thermoplastic prepreg containing a polycarbonate resin ("Tepexdynalite 102fr-FG290(x)/45%" produced by LANXESS) was used to prepare a fiber layer having a thickness of 2.0 mm. The (fiber mass/resin mass) was 1.13.

Evaluation

The resins, laminates, and resin layers used in the examples and the comparative examples were evaluated as follows. Tables 1 to 4 show the results.

(1) Oxygen Index, Weight Average Molecular Weight, and Glass Transition Temperature (Tg) of Resin The oxygen index of the resins was measured by a method in conformity with JIS K 7201-2:2007. The weight average molecular weight of the resins was measured by a method in conformity with ASTM D 2503. The glass transition temperature (Tg) of the resins was measured by a method in conformity with the JIS K 7121.

The weight average molecular weight of the chlorinated polyvinyl chloride resins, polyvinyl chlorides, and polycarbonate resins was specifically measured by the following method.

First, a resin sample was dissolved in THF and filtrated through a filter having a pore size of 0.2 μm. Measurement was then performed using a GPC unit (pump unit: PU-4180, detector unit: RI-4030, column oven: CO-4065) produced by JASCO Corporation at a flow rate of 0.7 ml/min and an oven temperature of 40° C., whereby the sample was eluted and separated. The molecular weight was determined based on a calibration curve produced using standard polystyrene. The columns used were SHODEX columns LF-804 (two columns connected).

The weight average molecular weight of the polyamide resins was measured by the following method.

Specifically, first, a laminate sample was weighed. A predetermined amount of eluent was added, and the sample was allowed to stand at room temperature overnight for dissolution. Subsequently, the obtained solution was shaken gently and then filtered through a 0.45 μm PTFE cartridge filter to separate the polyamide resin as the filtrate.

Measurement was then performed under the following conditions.

<GPC Device>

HLC-8420GPC (produced by Tosoh Corporation)

<Column>

TSKgel SuperAWM-H (6.0 mm I.D.×15 cm)×2 (produced by Tosoh Corporation)

<Detector>

Differential refractometer (RI detector), polarity=(+)

<Eluent>

HFIP (1,1,1,3,3,3-hexafluoro-2-propanol) (produced by FUJIFILM Wako Pure Chemical Corporation)+10 mM-CF3COONa (produced by FUJIFILM Wako Pure Chemical Corporation, 1st grade)

<Measurement Conditions>

Flow rate: 0.3 ml/min

Column temperature: 40° C.

Sample concentration: 1 mg/ml (polyamide-based concentration)

Sample injection volume: 20 μL

Calibration curve: cubic approximation curve produced using standard PMMA (produced by Agilent Technologies, Inc.)

(2) Thermal Conductivity and Rate of Volume Expansion

The laminates obtained in Examples 1 to 15 and Comparative Examples 1 and 2 and the fiber layers obtained in Comparative Examples 3 and 4 were each cut into a measurement sample having a size of 100 mm×100 mm. The thermal conductivity of the measurement sample was measured in conformity with JIS R 2616.

Further, the obtained measurement sample was fixed to a fixture such that the thickness direction corresponded to the vertical direction. The sample was heated from below with the distance between the sample and a burner being 20 mm. The heating was continued at 800° C. for one minute, and then the thermal conductivity was measured in the same manner as above. The rate of change of thermal conductivity and the rate of decrease in thermal conductivity were calculated by the following formulas (1) and (2).

(Rate of change of thermal conductivity)=[(Thermal conductivity before heating)−(Thermal conductivity after heating)]/(Thermal conductivity after heating) (1)

(Rate of decrease in thermal conductivity)=[(Thermal conductivity before heating)−(Thermal conductivity after heating)]/(Thermal conductivity before heating)×100 (2)

The thickness of the measurement sample after heating at 800° C. for one minute was measured, and the rate of volume expansion was measured by the following formula (3).

(Rate of volume expansion)=[(Maximum thickness after heating)−(Thickness before heating)]/(Thickness before heating) (3)

For the laminate obtained in Comparative Example 1, the thermal conductivity after heating, the rate of change of thermal conductivity, the rate of decrease in thermal conductivity, and the rate of volume expansion were unable to be measured because the resin was burned off before 800° C. was reached.

(3) Flame Escape and Back Surface Temperature

The laminates obtained in Examples 1 to 15 and Comparative Example 1 and 2 and the fiber layers obtained in Comparative Examples 3 and 4 were each cut into a measurement sample having a size of 150 mm×150 mm. The obtained measurement sample was fixed to a fixture such that the thickness direction corresponded to the vertical direction. The sample was heated for five minutes from below with the distance between the sample and a burner being 20 mm. The state during heating was observed and evaluated in accordance with the following criteria.

○ (Good): No flame escape above the measurement sample was observed.

x (Poor): A flame escape above the measurement sample was observed.

The temperature of the back surface opposite to the heated surface was monitored with a thermography, and the time required for the back surface temperature to reach 300° C. was measured.

(4) Appearance of Battery Cover

Preparation of Cover for Lithium-Ion Battery

Figure 2:
FIG. 2 is a cross-sectional view illustrating molding of a battery cover.

The laminates obtained in Examples 1 to 15 were each press-molded as shown in FIG. 2 (temperature 200° C., preheating for four minutes, compression for four minutes, cooling for four minutes) using molds shown in FIG. 1 to prepare a molded article simulating a cover for a lithium-ion battery. The obtained molded articles had good appearance free of cracks or fractures.

(5) Bending Strength After Drawing

The laminates obtained in Examples 1 to 15 and Comparative Examples 1 and 2 and the fiber layers obtained in Comparative Example 3 and 4 were each heated with an infrared heater to a surface temperature of 210° C. (230° C. for a resin including a polycarbonate resin, 240° C. for a resin including a polyamide resin).

Figure 3:
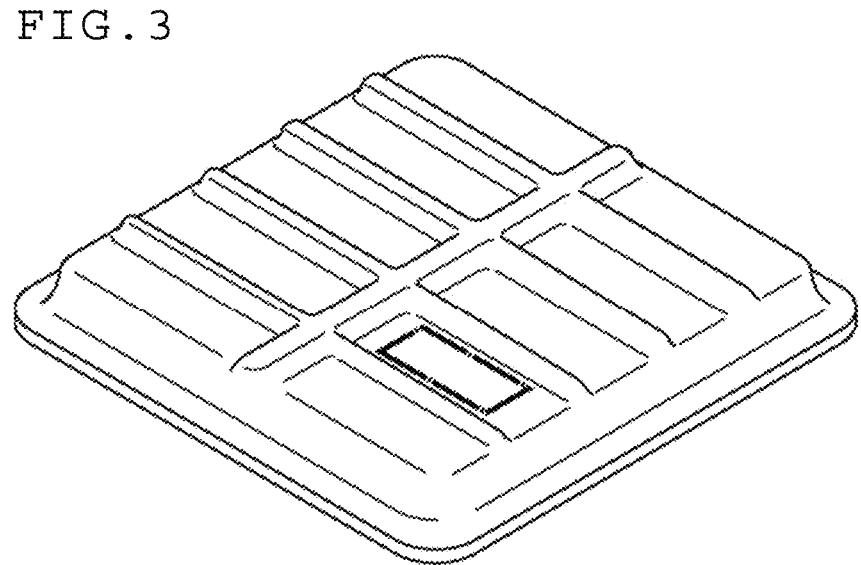
FIG. 3 is a perspective view of a drawn sample used for measuring bending strength after drawing.

The laminate after heating was placed in a press mold at a mold temperature of 170° C. The laminate was pressed at a clamping force of 30 t and held for 10 seconds. The mold was then cooled to 50° C. over 20 minutes, whereby a drawn sample as shown in FIG. 3 was obtained.

Figure 4:
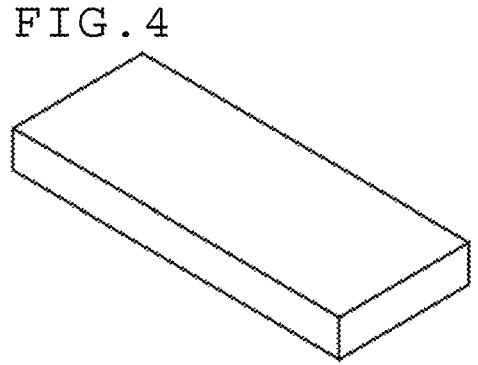
FIG. 4 is a perspective view of a bending test sample cut out of the drawn sample.

From a flat portion (portion indicated by dashed lines in FIG. 3) of the drawn sample, a bending test sample (65 mm×10 mm) was cut out as shown in FIG. 4 using a composite material cutter AC-300CF (produced by Maruto Testing Machine Company). The bending strength was measured using "TENSILON" produced by Orientec Corporation in conformity with JIS K7171.

TABLE 1

| | | | Example | | | | |
|---|---|---|---|---|---|---|---|
| | | | 1 | 2 | 3 | 4 | 5 |
| Fiber layer | Resin | Type | CPVC | CPVC | Polyamide | Polycarbonate | PVC |
| | | Average degree of polymerization | 1000 | 1000 | — | — | 1000 |
| | | Chlorine content (parts by mass) | 72.0 | 72.0 | — | — | 56.7 |
| | | Oxygen index | 65 | 65 | 24 | 25 | 48 |
| | | Mw | 142000 | 142000 | 30000 | 25000 | 130000 |
| | | Tg (° C.) | 115 | 115 | 50 | 152 | 88 |
| | | Amount (% by weight) | 44.7 | 44.7 | 40.2 | 39.5 | 37.8 |
| | Fiber | Type | Glass fiber | Glass fiber | Glass fiber | Glass fiber | Glass fiber |
| | | Average fiber size (μm) | 7 | 7 | 7 | 7 | 7 |
| | | Average fiber length (mm) | 50 | 50 | 50 | 50 | 50 |
| | | Specific gravity | 2.6 | 2.6 | 2.6 | 2.6 | 2.6 |
| | | Weight per unit area (g/m²) | 450 | 450 | 450 | 450 | 450 |
| | | Amount (% by mass) | 50.3 | 50.3 | 45.1 | 44.8 | 58.4 |
| | Fiber mass/resin mass | | 1.13 | 1.13 | 1.12 | 1.13 | 1.54 |
| | Thickness (mm) | | 1.7 | 1.7 | 1.7 | 1.7 | 1.7 |
| Thermal insulation layer | Resin | Type | CPVC | CPVC | CPVC | CPVC | CPVC |
| | | Average degree of polymerization | 500 | 500 | 500 | 500 | 500 |
| | | Chlorine content (% by mass) | 67.3 | 67.3 | 67.3 | 67.3 | 67.3 |
| | | % by weight | 88.5 | 82.0 | 82.0 | 82.0 | 82.0 |
| | Inorganic filler | Type | Carbon black | Titanium oxide | Titanium oxide | Titanium oxide | Titanium oxide |
| | | % by weight | 0.9 | 8.2 | 8.2 | 8.2 | 8.2 |
| | Thickness (mm) | | 0.3 | 0.3 | 0.3 | 0.3 | 0.3 |

| | | | Example | | | | |
|---|---|---|---|---|---|---|---|
| | | | 6 | 7 | 8 | 9 | 10 |
| Fiber layer | Resin | Type | CPVC | CPVC | CPVC | CPVC | CPVC |
| | | Average degree of polymerization | 500 | 500 | 500 | 500 | 500 |
| | | Chlorine content (parts by mass) | 67.3 | 67.3 | 67.3 | 67.3 | 67.3 |
| | | Oxygen index | 60 | 60 | 60 | 60 | 60 |
| | | Mw | 70000 | 70000 | 70000 | 70000 | 70000 |
| | | Tg (° C.) | 107 | 107 | 107 | 107 | 107 |
| | | Amount (% by weight) | 37.8 | 45.9 | 37.8 | 37.8 | 37.8 |
| | Fiber | Type | Glass fiber | Carbon fiber | Glass fiber | Glass fiber | Glass fiber |
| | | Average fiber size (μm) | 7 | 10 | 7 | 7 | 7 |
| | | Average fiber length (mm) | 50 | Continuous fiber | 50 | 50 | 50 |
| | | Specific gravity | 2.6 | 2.1 | 2.6 | 2.6 | 2.6 |
| | | Weight per unit area (g/m²) | 450 | 220 | 450 | 450 | 450 |
| | | Amount (% by mass) | 58.4 | 50.1 | 58.4 | 58.4 | 58.4 |
| | Fiber mass/resin mass | | 1.54 | 1.09 | 1.54 | 1.54 | 1.54 |
| | Thickness (mm) | | 1.7 | 1.7 | 1.7 | 1.7 | 1.7 |
| Thermal insulation layer | Resin | Type | CPVC | CPVC | PVC | Polycarbonate | Polyamide |
| | | Average degree of polymerization | 500 | 500 | 500 | — | — |
| | | Chlorine content (% by mass) | 67.3 | 67.3 | 56.7 | — | — |
| | | % by weight | 82.0 | 82.0 | 82.0 | 90.9 | 90.9 |
| | Inorganic filler | Type | Titanium oxide | Titanium oxide | Titanium oxide | Titanium oxide | Titanium oxide |
| | | % by weight | 8.2 | 8.2 | 8.2 | 9.1 | 9.1 |
| | Thickness (mm) | | 0.3 | 0.3 | 0.3 | 0.3 | 0.3 |

TABLE 2

| | | | Example | | | | |
|---|---|---|---|---|---|---|---|
| | | | 11 | 12 | 13 | 14 | 15 |
| Fiber layer | Resin | Type | CPVC | CPVC | CPVC | Polyamide | Polycarbonate |
| | | Average degree of polymerization | 500 | 500 | 500 | — | — |
| | | Chlorine content (parts by mass) | 67.3 | 67.3 | 67.3 | — | — |
| | | Oxygen index | 60 | 60 | 60 | 24 | 25 |
| | | Mw | 70000 | 70000 | 70000 | 30000 | 25000 |
| | | Tg (° C.) | 107 | 107 | 107 | 50 | 152 |
| | | Amount (% by weight) | 37.8 | 40.7 | 30.8 | 40.2 | 39.5 |
| | Fiber | Type | Glass fiber | Glass fiber | Glass fiber | Glass fiber | Glass fiber |
| | | Average fiber size (μm) | 7 | 7 | 7 | 7 | 7 |
| | | Average fiber length (mm) | 50 | 50 | 50 | 50 | 50 |
| | | Specific gravity | 2.6 | 2.6 | 2.6 | 2.6 | 2.6 |
| | | Weight per unit area (g/m$^2$) | 450 | 380 | 600 | 450 | 450 |
| | | Amount (% by mass) | 58.4 | 54.9 | 64.8 | 45.1 | 44.8 |
| | Fiber mass/resin mass | | 1.54 | 1.35 | 2.10 | 1.12 | 1.13 |
| | Thickness (mm) | | 1.7 | 1.7 | 1.7 | 1.7 | 1.7 |
| Thermal insulation layer | Resin | Type | PVC | CPVC | CPVC | Polyamide | Polycarbonate |
| | | Average degree of polymerization | 500 | 500 | 500 | — | — |
| | | Chlorine content (% by mass) | 67.3 | 67.3 | 67.3 | — | — |
| | | % by weight | 82.0 | 82.0 | 82.0 | 90.9 | 90.9 |
| | Inorganic filler | Type | Expandable graphite | Titanium oxide | Titanium oxide | Titanium oxide | Titanium oxide |
| | | % by weight | 8.2 | 8.2 | 8.2 | 9.1 | 9.1 |
| | Thickness (mm) | | 0.3 | 0.3 | 0.3 | 0.3 | 0.3 |

| | | | Comparative Example | | | |
|---|---|---|---|---|---|---|
| | | | 1 | 2 | 3 | 4 |
| Fiber layer | Resin | Type | — | CPVC | Polyamide | Polycarbonate |
| | | Average degree of polymerization | — | 1000 | — | — |
| | | Chlorine content (parts by mass) | — | 72.0 | — | — |
| | | Oxygen index | — | 65 | 24 | 25 |
| | | Mw | — | 142000 | 30000 | 25000 |
| | | Tg (° C.) | — | 115 | 50 | 152 |
| | | Amount (% by weight) | — | 35.2 | 40.2 | 39.5 |
| | Fiber | Type | — | Glass fiber | Glass fiber | Glass fiber |
| | | Average fiber size (μm) | — | 7 | 7 | 7 |
| | | Average fiber length (mm) | — | 50 | 50 | 50 |
| | | Specific gravity | — | 2.6 | 2.6 | 2.6 |
| | | Weight per unit area (g/m$^2$) | — | 450 | 450 | 450 |
| | | Amount (% by mass) | — | 60.9 | 45.1 | 44.8 |
| | Fiber mass/resin mass | | — | 0.98 | 1.12 | 1.13 |
| | Thickness (mm) | | — | 2 | 2.5 | 2 |
| Thermal insulation layer | Resin | Type | CPVC | — | — | — |
| | | Average degree of polymerization | 1000 | — | — | — |
| | | Chlorine content (% by mass) | 72 | — | — | — |
| | | % by weight | 89.3 | — | — | — |
| | Inorganic filler | Type | — | — | — | — |
| | | % by weight | — | — | — | — |
| | Thickness (mm) | | 2 | — | — | — |

TABLE 3

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Evaluation | Thermal conductivity (W/mK) | Before heating | 0.263 | 0.239 | 0.295 | 0.244 | 0.225 | 0.245 | 0.238 | 0.246 | 0.255 | 0.261 |
| | | After heating | 0.110 | 0.105 | 0.112 | 0.095 | 0.100 | 0.098 | 0.105 | 0.093 | 0.116 | 0.118 |
| | | Rate of change | 1.4 | 1.3 | 1.6 | 1.6 | 1.3 | 1.5 | 1.3 | 1.6 | 1.2 | 1.2 |
| | | Rate of decrease (%) | 58 | 56 | 62 | 61 | 56 | 60 | 56 | 62 | 55 | 55 |
| | Rate of volume expansion | | 5.4 | 6.8 | 7.1 | 5.9 | 3.9 | 4.8 | 3.5 | 6.1 | 2.1 | 2.2 |
| | Flame escape | | ○ | ○ | ○ | ○ | ○ | ○ | ○ | ○ | ○ | ○ |
| | Time at which back surface temperature reached 300° C. (sec) | | 154 | 138 | 140 | 126 | 104 | 121 | 95 | 99 | 78 | 69 |
| | Bending strength after drawing | | 21 | 21 | 21 | 21 | 18 | 20 | 5 | 17 | 20 | 19 |

TABLE 4

| | | | Example | | | | | Comparative Example | | | |
|---|---|---|---|---|---|---|---|---|---|---|---|
| | | | 11 | 12 | 13 | 14 | 15 | 1 | 2 | 3 | 4 |
| Evaluation | Thermal conductivity (W/mK) | Before heating | 0.229 | 0.216 | 0.215 | 0.266 | 0.257 | 0.17 | 0.246 | 0.272 | 0.259 |
| | | After heating | 0.018 | 0.085 | 0.085 | 0.129 | 0.120 | Resin burned off | 0.121 | 0.184 | 0.162 |
| | | Rate of change | 11.7 | 1.5 | 1.5 | 1.1 | 1.1 | — | 1.0 | 0.5 | 0.6 |
| | | Rate of decrease (%) | 92 | 61 | 60 | 52 | 53 | — | 51 | 32 | 37 |
| | Rate of volume expansion | | 9.8 | 4.9 | 5.5 | 1.9 | 2.0 | — | 1.9 | 1.7 | 1.8 |
| | Flame escape | | ○ | ○ | ○ | ○ | ○ | x | ○ | ○ | ○ |
| | Time at which back surface temperature reached 300° C. (sec) | | 340 | 85 | 130 | 55 | 62 | 22 | 48 | 53 | 35 |
| | Bending strength after drawing | | 13 | 22 | 18 | 19 | 17 | 0.28 | 19 | 20 | 20 |

INDUSTRIAL APPLICABILITY

The present invention can provide a laminate that has excellent flame-shielding performance and heat-shielding performance and can reduce the transmission of flame and heat generated by ignition inside a battery to the outside, especially when used as a cover for an in-vehicle battery.

REFERENCE SIGNS LIST

1 mold
2 laminate

The invention claimed is:

1. A laminate comprising:
a fiber layer including a resin and a fiber; and
a thermal insulation layer formed on at least one surface of the fiber layer, wherein the laminate has a thermal conductivity after heating at 800° C. for one minute of 0.01 to 0.15 W/mK, and
the resin constituting the fiber layer has an oxygen index of 20 or greater.

2. The laminate according to claim 1,
wherein a rate of change of thermal conductivity after heating at 800° C. for one minute, represented by the following formula (1), is 1 to 10:

$$\text{(Rate of change of thermal conductivity)}=[\text{(Thermal conductivity before heating)}-\text{(Thermal conductivity after heating)}]/\text{(Thermal conductivity after heating)} \tag{1}$$

3. The laminate according to claim 1,
wherein a rate of volume expansion, represented by the following formula (3), after heating at 800° C. for one minute is 2 times or greater:

$$\text{(Rate of volume expansion)}=[\text{(Maximum thickness after heating)}-\text{(Thickness before heating)}]/\text{(Thickness before heating)} \tag{3}$$

4. The laminate according to claim 1, further comprising, on a surface of the thermal insulation layer opposite to the surface facing the fiber layer, a fiber layer including a resin and a fiber.

5. The laminate according to claim 1,
wherein the resin constituting the fiber layer is a chlorinated polyvinyl chloride resin having an average degree of polymerization of 400 to 3,000 and a chlorine content of 57 to 72% by mass.

6. The laminate according to claim 1,
wherein the fiber constituting the fiber layer is at least one selected from the group consisting of a glass fiber and a carbon fiber.

7. The laminate according to claim 1,
wherein an amount of the fiber in the fiber layer is 10 to 80% by mass.

8. The laminate according to claim 1, which is a cover for a lithium-ion battery.

9. A method for using the laminate according to claim 1 as a cover for a lithium-ion battery.

10. A laminate comprising:
a fiber layer including a resin and a fiber; and
a thermal insulation layer formed on at least one surface of the fiber layer, wherein a rate of change of thermal conductivity after heating at 800° C. for one minute, represented by the following formula (1), is 1 to 10:

$$\text{(Rate of change of thermal conductivity)}=[\text{(Thermal conductivity before heating)}-\text{(Thermal conductivity after heating)}]/\text{(Thermal conductivity after heating)} \tag{1}$$

11. A laminate comprising:

a fiber layer including a resin and a fiber; and a thermal insulation layer formed on at least one surface of the fiber layer, wherein a rate of volume expansion, represented by the following formula (3), after heating at 800° C. for one minute is 2 times or greater:

$$\text{(Rate of volume expansion)} = [\text{(Maximum thickness after heating)} - \text{(Thickness before heating)}] / \text{(Thickness before heating)} \quad (3).$$

12. A laminate comprising:

a fiber layer including a resin and a fiber; and a thermal insulation layer formed on at least one surface of the fiber layer, wherein the resin constituting the fiber layer is a chlorinated polyvinyl chloride resin having an average degree of polymerization of 400 to 3,000 and a chlorine content of 57 to 72% by mass.

\* \* \* \* \*